UNITED STATES PATENT OFFICE.

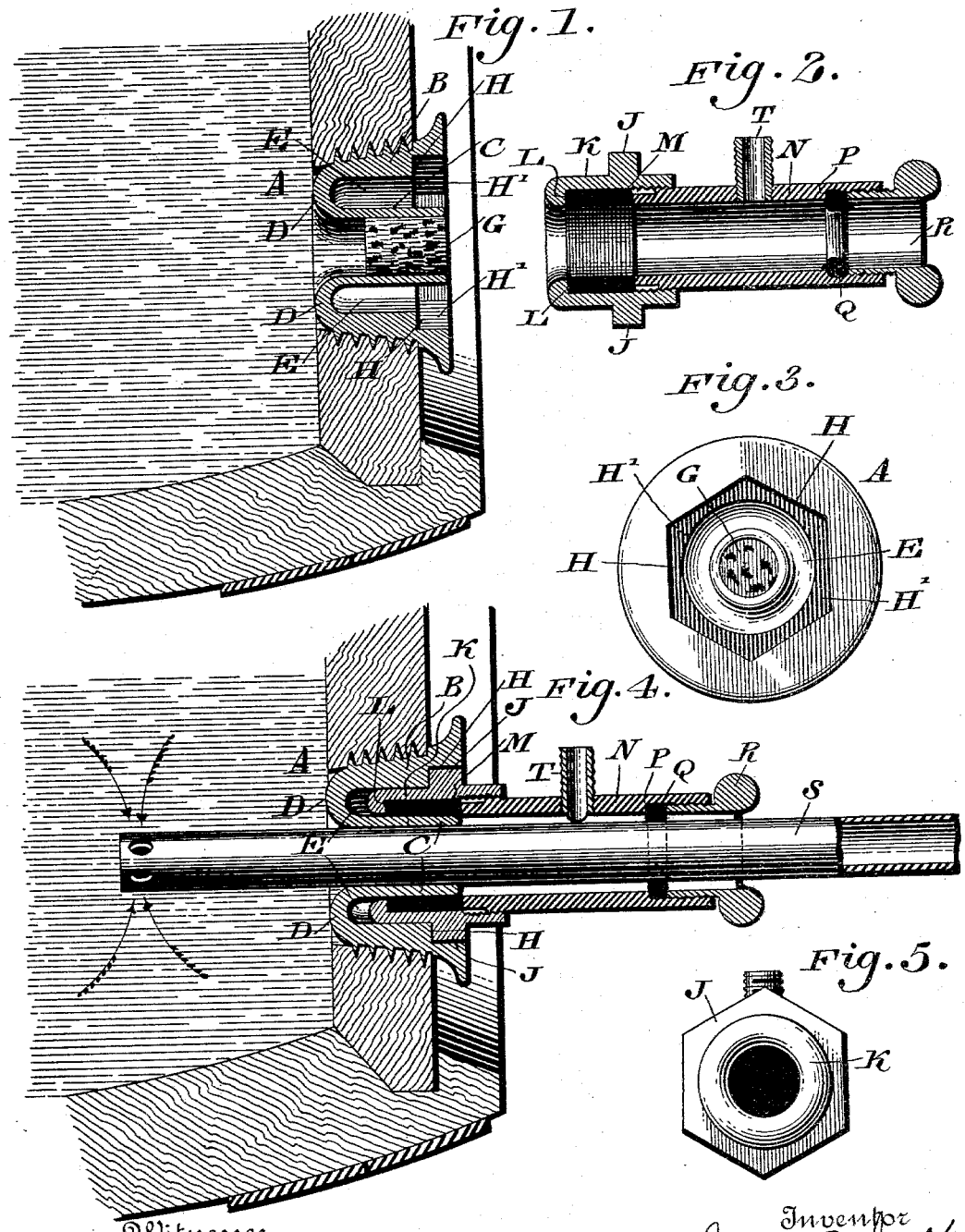

GEORGE W. JACKSON, OF PHILADELPHIA, PENNSYLVANIA.

BUNG AND TAP.

SPECIFICATION forming part of Letters Patent No. 551,286, dated December 10, 1895.

Application filed March 25, 1895. Serial No. 543,011. (No model.)

*To all whom it may concern:*

Be it known that I, GEORGE W. JACKSON, a citizen of the United States, residing in the city and county of Philadelphia, State of Pennsylvania, have invented a new and useful Improvement in Bungs and Taps, which improvement is fully set forth in the following specification and accompanying drawings.

My invention consists of a bung which is adapted to receive a tap, both of novel construction, as will be hereinafter set forth.

Figures 1 and 2 represent longitudinal sections of a bung and tap embodying my invention. Fig. 3 represents an end view of the bung. Fig. 4 represents a longitudinal section of the bung and tap in position. Fig. 5 represents an end view of the tap.

Similar letters of reference indicate corresponding parts in the several figures.

Referring to the drawings, A designates a bung which consists of the outer and inner walls B and C, which are joined at their ends, as at D, leaving between them the channel E, which is closed at its inner end and open at its outer end, the central wall having within it the bore F, in which latter is seated the cork or stopper G, whereby the bung is in closed condition, it being seen that the exterior of the bung is threaded, whereby it may be screwed into a proper part of a barrel, keg, &c. On the outer end of the wall B is a shoulder H, against which abuts the flange J on the periphery of a collar or bushing K, which latter is adapted to enter the channel E of the bung. On the inner peripheries of said collar is a shoulder L, against which rests the packing M, which is of annular form, and encircles the wall C of the bung.

N designates a sleeve which is screwed to the interior of the collar K, and adapted to bear against the outer end of the packing M, while the inner end of the same is rested against the shoulder L, as has been stated.

On the interior of the sleeve N is a shoulder P, on which is seated the annular packing Q, the latter being engaged by the thumb-nut R, which is screwed to the said sleeve, and adapted to compress said packing against the draft-tube S, it now being noticed that the collar M and sleeve N constitute a tap, and that said tube S is adapted to discharge the contents of the barrel, &c., to which the bung is secured.

The operation is as follows: When the bung is closed by the stopper G, and it is desired to tap the barrel, &c., the collar K is inserted in the channel E, and the sleeve N screwed into said collar, whereby the packing M is compressed, thus holding the collar in position in the bung. The tube S is passed through the nut R, sleeve N, and forced against the stopper G, thus driving the latter through the bung into the barrel, &c., the inner end of the tube S also entering the barrel, &c., through the bung. The sleeve is further rotated, whereby the packing M is compressed to a greater extent against the end of the sleeve N, thus forming a tight joint between the bung and sleeve. The nut K is also tightened, thus compressing the packing Q against said tube S, forming a tight joint between the outer end of the sleeve and said tube. By this means leakage around the tube is prevented, and said tube is held steadily and firmly in position.

The chamber H' in the bung A, outside of the shoulder H, is of angular form, and the flange J, which enters said chamber and engages with said shoulder, is also of angular form, so that the collar K, when in position, is prevented from rotating. The sleeve N is provided with a branch or stem T, for attachment of a pipe or hose leading from an air-pressure device, for admitting air into the barrel, keg, &c, through the sleeve N and the small space existing between the tube S and inner wall C of the bung.

Having thus described my invention, what I claim as new, and desire to secure by Letters Patent, is—

1. A bung composed of outer and inner walls with an intermediate channel closed at its inner end and open at its outer one, and having a shoulder on the outer wall and an angular shaped chamber outside of said shoulder, substantially as and for the purpose set forth.

2. The bung A having inner and outer walls with the intermediate channel E closed at its inner end, and the angular shaped chamber H' at its outer end, the outer wall having the shoulder H thereon, in combination with the collar K having the flange J adapted to abut against said shoulder and fit in said chamber H', substantially as described.

3. The bung A having the inner and outer walls with an intermediate channel E and a chamber H' said channel being closed at its inner end the outer wall having the shoulder H thereon, the collar K with the flange J on its outer face and the shoulder L on its inner one, the sleeve N having a threaded connection with said collar, and the packing M between said shoulder L and the end of said sleeve, said parts being combined substantially as described.

4. A bung having inner and outer walls with an intermediate channel closed at its inner end, a collar with a flange abutting against a shoulder on the outer wall, a sleeve having a screw threaded connection with said collar, a packing between an end of said sleeve and a shoulder on said collar, a thumb nut working in said sleeve, and bearing against a packing in said sleeve, and a draft tube passing through said nut, sleeve collar and bung, and in contact with said packing in the sleeve, said parts being combined substantially as described.

5. A bung with inner and outer walls with an intermediate channel closed at its inner end, a collar having a flange seated on a shoulder of said bung, a sleeve connected with said collar, a thumb nut bearing against a packing in said sleeve, a draft tube passing through said nut, sleeve, collar and bung, and an air tube leading to said sleeve, intermediate of said packing and collar, said parts being combined substantially as described.

GEORGE W. JACKSON.

Witnesses:
JOHN A. WIEDERSHEIM,
R. H. GRAESER.